(12) United States Patent
Hyland et al.

(10) Patent No.: US 11,669,590 B2
(45) Date of Patent: Jun. 6, 2023

(54) MANAGING PREDICTIONS FOR VEHICLE REPAIR ESTIMATES

(71) Applicant: Mitchell International, Inc., San Diego, CA (US)

(72) Inventors: Joseph Hyland, San Diego, CA (US); Abhijeet Gulati, San Diego, CA (US); Dmitri Soloviev, San Diego, CA (US); Chenlei Zhang, San Diego, CA (US); Prarit Lamba, San Diego, CA (US)

(73) Assignee: Mitchell International, Inc., San Diego, CA (US)

( * ) Notice: Subject to any disclaimer, the term of this patent is extended or adjusted under 35 U.S.C. 154(b) by 374 days.

(21) Appl. No.: 16/929,984

(22) Filed: Jul. 15, 2020

(65) Prior Publication Data

US 2022/0019858 A1    Jan. 20, 2022

(51) Int. Cl.
| | |
|---|---|
| *G06N 20/00* | (2019.01) |
| *G06F 18/21* | (2023.01) |
| *G06Q 10/20* | (2023.01) |
| *G06Q 10/10* | (2023.01) |
| *G06Q 40/08* | (2012.01) |
| *G06F 18/40* | (2023.01) |
| *G06Q 10/0875* | (2023.01) |

(52) U.S. Cl.
CPC ......... *G06F 18/2178* (2023.01); *G06F 18/41* (2023.01); *G06N 20/00* (2019.01); *G06Q 10/10* (2013.01); *G06Q 10/20* (2013.01); *G06Q 40/08* (2013.01); *G06Q 10/0875* (2013.01)

(58) Field of Classification Search
CPC .... G06K 9/6263; G06K 9/6254; G06N 20/00; G06Q 10/10; G06Q 10/20; G06Q 40/08; G06Q 10/0875; G06V 10/7784; G06V 10/7788; G06V 20/00
See application file for complete search history.

(56) References Cited

U.S. PATENT DOCUMENTS

| | | |
|---|---|---|
| 5,432,904 A | 7/1995 | Wong |
| 5,504,674 A | 4/1996 | Chen et al. |
| 5,950,169 A | 9/1999 | Borghesi et al. |
| 6,047,858 A | 4/2000 | Romer |
| 6,107,399 A | 8/2000 | Selley et al. |
| 6,381,561 B1 | 4/2002 | Bomar, Jr. et al. |
| 6,470,303 B2 | 10/2002 | Kidd et al. |

(Continued)

*Primary Examiner* — Christopher M Brandt
(74) *Attorney, Agent, or Firm* — Sheppard Mullin Richter & Hampton LLP

(57) ABSTRACT

Systems and methods for managing predictions for vehicle repair estimates are provided. A method includes providing one or more images of a damaged vehicle as input to a machine learning model, wherein the machine learning model has been trained with images of other damaged vehicles and corresponding vehicle operations, wherein each of the vehicle operations represents the repair or replacement of a vehicle component; receiving output of the machine learning model responsive to the input, wherein the output comprises a plurality of values each corresponding to one of a plurality of the vehicle operations; determining a confidence metric based on the values; making a comparison between the confidence metric and a confidence threshold value; and selecting the one of the plurality of the vehicle operations corresponding to the highest value as a predicted operation based on the comparison.

23 Claims, 7 Drawing Sheets

(56) References Cited

U.S. PATENT DOCUMENTS

| | | |
|---|---|---|
| 6,885,981 B2 | 4/2005 | Bomar, Jr. et al. |
| 7,197,444 B2 | 3/2007 | Bomar, Jr. et al. |
| 7,359,821 B1 | 4/2008 | Smith et al. |
| 7,502,772 B2 | 3/2009 | Kidd et al. |
| 7,698,086 B2 | 4/2010 | Kidd et al. |
| 7,716,002 B1 | 5/2010 | Smith et al. |
| 7,974,808 B2 | 7/2011 | Smith et al. |
| 8,019,629 B1 | 9/2011 | Medina, III et al. |
| 8,095,391 B2 | 1/2012 | Obora et al. |
| 8,160,904 B1 | 4/2012 | Smith |
| 8,239,220 B2 | 8/2012 | Kidd et al. |
| 8,260,639 B1 | 9/2012 | Medina, III et al. |
| 8,612,170 B2 | 12/2013 | Smith et al. |
| 8,712,806 B1 | 4/2014 | Medina, III et al. |
| 9,218,626 B1 | 12/2015 | Haller, Jr. et al. |
| 9,228,834 B2 | 1/2016 | Kidd et al. |
| 9,500,545 B2 | 11/2016 | Smith et al. |
| 9,721,400 B1 | 8/2017 | Oakes, III et al. |
| 9,846,093 B2 | 12/2017 | Smith et al. |
| 10,339,728 B1 | 7/2019 | Oakes, III et al. |
| 10,410,439 B1 | 10/2019 | Gingrich et al. |
| 10,510,142 B1 | 12/2019 | Dohner et al. |
| 10,922,726 B1 | 2/2021 | Nelson et al. |
| 10,949,814 B1 * | 3/2021 | Nelson .................. G06N 20/00 |
| 11,238,506 B1 * | 2/2022 | Tomlinson ............. G06V 20/52 |
| 11,288,789 B1 * | 3/2022 | Chen ....................... G06T 7/001 |
| 2005/0267774 A1 | 12/2005 | Merritt et al. |
| 2014/0122130 A1 | 5/2014 | Kelly et al. |
| 2015/0213556 A1 | 7/2015 | Haller, Jr. et al. |
| 2016/0178465 A1 | 6/2016 | Smith et al. |
| 2016/0275414 A1 * | 9/2016 | Towal ...................... G06N 3/08 |
| 2017/0220956 A1 * | 8/2017 | Stephens ................ G06F 3/0482 |
| 2018/0189453 A1 * | 7/2018 | Chattopadhyay ...... G06N 20/00 |
| 2018/0300576 A1 | 10/2018 | Dalyac et al. |

* cited by examiner

MANAGING PREDICTIONS FOR VEHICLE REPAIR ESTIMATES

DESCRIPTION OF RELATED ART

The disclosed technology relates generally to systems for estimating vehicle repairs, and more particularly, some embodiments relate to systems and methods for implementing the same.

SUMMARY

A claimed solution rooted in computer technology overcomes problems specifically arising in the realm of computer technology.

In general, one aspect disclosed features a system, comprising: a hardware processor; and a non-transitory machine-readable storage medium encoded with instructions executable by the hardware processor to perform a method comprising: providing one or more images of a damaged vehicle as input to a machine learning model, wherein the machine learning model has been trained with images of other damaged vehicles and corresponding vehicle operations, wherein each of the vehicle operations represents the repair or replacement of a vehicle component; receiving output of the machine learning model responsive to the input, wherein the output comprises a plurality of values each corresponding to one of a plurality of the vehicle operations; determining a confidence metric based on the values; making a comparison between the confidence metric and a confidence threshold value; and selecting the one of the plurality of the vehicle operations corresponding to the highest value as a predicted operation based on the comparison.

Embodiments of the system may include one or more of the following features. In some embodiments, determining a confidence metric based on the values comprises: obtaining a difference between the two highest values. In some embodiments, the method further comprises selecting the one of the plurality of the vehicle operations corresponding to the highest value as a predicted vehicle operation responsive to the difference being greater than the confidence threshold value. In some embodiments, the method further comprises declaring no prediction responsive to the difference being less than the confidence threshold value. In some embodiments, the method further comprises providing the predicted vehicle operation as a relearning input to the machine learning model. In some embodiments, the method further comprises obtaining a human selection of one of the vehicle operations; and providing the selected vehicle operation as a relearning input to the machine learning model. In some embodiments, the plurality of values sum to one (1). In some embodiments, the method further comprises moving a decision boundary separating repair operations and replace operations.

In general, one aspect disclosed features non-transitory machine-readable storage medium encoded with instructions executable by a hardware processor of a computing component, the machine-readable storage medium comprising instructions to cause the hardware processor to perform a method comprising: providing one or more images of a damaged vehicle as input to a machine learning model, wherein the machine learning model has been trained with images of other damaged vehicles and corresponding vehicle operations, wherein each of the vehicle operations represents the repair or replacement of a vehicle component; receiving output of the machine learning model responsive to the input, wherein the output comprises a plurality of values each corresponding to one of a plurality of the vehicle operations; determining a confidence metric based on the values; making a comparison between the confidence metric and a confidence threshold value; and selecting the one of the plurality of the vehicle operations corresponding to the highest value as a predicted operation based on the comparison.

Embodiments of the non-transitory machine-readable storage medium may include one or more of the following features. In some embodiments, determining a confidence metric based on the values comprises: obtaining a difference between the two highest values. In some embodiments, the method further comprises selecting the one of the plurality of the vehicle operations corresponding to the highest value as a predicted vehicle operation responsive to the difference being greater than the confidence threshold value. In some embodiments, the method further comprises declaring no prediction responsive to the difference being less than the confidence threshold value. In some embodiments, the method further comprises providing the predicted vehicle operation as a relearning input to the machine learning model. In some embodiments, the method further comprises obtaining a human selection of one of the vehicle operations; and providing the selected vehicle operation as a relearning input to the machine learning model. In some embodiments, the plurality of values sum to one (1). In some embodiments, the method further comprises moving a decision boundary separating repair operations and replace operations.

In general, one aspect disclosed features computer-implemented method comprising: providing one or more images of a damaged vehicle as input to a machine learning model, wherein the machine learning model has been trained with images of other damaged vehicles and corresponding vehicle operations, wherein each of the vehicle operations represents the repair or replacement of a vehicle component; receiving output of the machine learning model responsive to the input, wherein the output comprises a plurality of values each corresponding to one of a plurality of the vehicle operations; determining a confidence metric based on the values; making a comparison between the confidence metric and a confidence threshold value; and selecting the one of the plurality of the vehicle operations corresponding to the highest value as a predicted operation based on the comparison.

Embodiments of the method may include one or more of the following features. In some embodiments, determining a confidence metric based on the values comprises: obtaining a difference between the two highest values. Some embodiments comprise selecting the one of the plurality of the vehicle operations corresponding to the highest value as a predicted vehicle operation responsive to the difference being greater than the confidence threshold value. Some embodiments comprise declaring no prediction responsive to the difference being less than the confidence threshold value. Some embodiments comprise providing the predicted vehicle operation as a relearning input to the machine learning model. Some embodiments comprise obtaining a human selection of one of the vehicle operations; and providing the selected vehicle operation as a relearning input to the machine learning model. Some embodiments comprise moving a boundary separating repair operations and replace operations.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

With the advent of high-power, cost effective computing systems came the increased automation of numerous facets of our contemporary society. In the insurance and other casualty and loss industries, for example, computerized claims estimating, processing, tracking and payment systems have long been in use to streamline processes and to expedite claims handling and closure.

Despite these advances, due to its collaborative nature, the generation of claims estimates remains a long and tedious process, requiring input and review from multiple parties involved in the estimating process. A conventional estimating process begins with one party, for example an estimator in a repair shop, generating an estimate. The estimate is then forwarded to a second party, for example a claims adjuster for an insurer, for review and possible modification. Any modifications by one party must be forwarded to another party for review and approval. The generation of a final estimate may involve any number of these review, modification, forwarding, and approval cycles, which may be applied by two or more lines of the estimate. For these reasons, conventional estimating processes consume a significant portion of the repair cycle.

Advances in machine learning have been applied to the process of generating claims estimates. For example, images of a damaged vehicle may be provided as input to a trained machine learning model, which provides outputs that can be used to automatically generate a repair estimate for the vehicle. For example, the outputs may include a recommendation, also referred to as a prediction, concerning whether to repair or replace a particular vehicle component.

The computer-generated estimate is generally reviewed by one or more humans before being committed. In many cases, the reviewer will disagree with a portion of the estimate. For example, a reviewer may disagree with the model's prediction to replace a component, and may instead decide to repair the component. One way to improve the estimate generation process is to reduce the number of such disagreements.

In this description, various embodiments are disclosed for generating estimates for vehicle repairs. However, embodiments of the disclosed technology apply to the generation of any type of estimate that requires binary predictions, such as whether to repair or replace a component. For example, embodiments may apply to generating estimates for medical procedures, and the like. These and other applications will be apparent to one skilled in the relevant art after reading this description. Before describing embodiments of the disclosed technology in detail, it is useful to describe an example environment in which the disclosed technology may be implemented.

Figure 1:
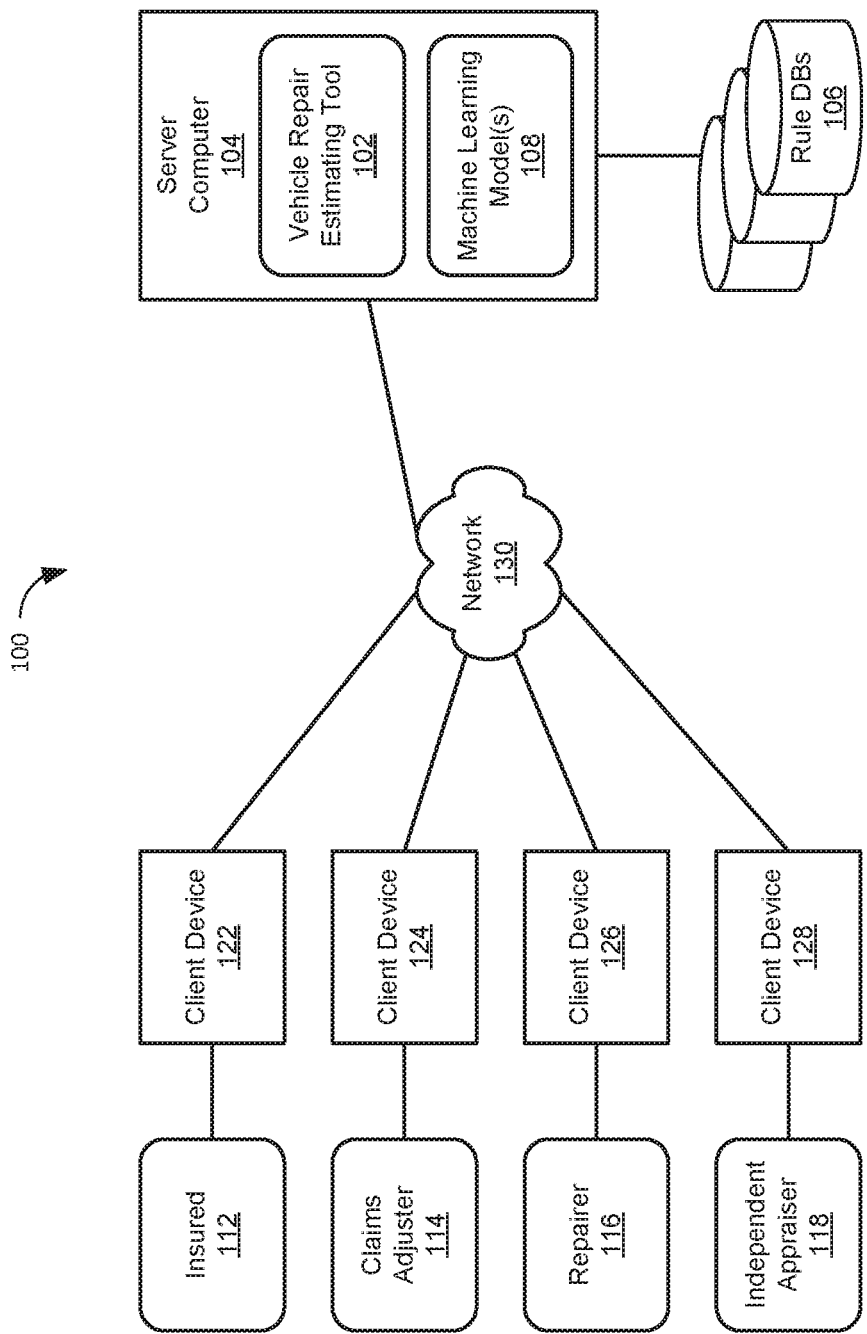
FIG. 1 illustrates a real-time collaborative vehicle repair estimating system according to some embodiments of the disclosed technology.

FIG. 1 illustrates a collaborative vehicle repair estimating system 100 according to some embodiments of the disclosed technology. Referring to FIG. 1, the system 100 may include a collaborative vehicle repair estimating tool 102, which may be implemented as one or more software packages executing on one or more server computers 104. The system may include one or more databases 106, which may store completed estimates, estimates in process, data regarding parts, part costs, labor, labor costs, and the like. The tool 102 may access the databases 106 over either a public or private network.

Multiple users may be involved in the estimating process. For example, users may include the insured 112, a claims adjuster 114, a repairer 116 such as an employee of a repair shop, an independent appraiser 118, and the like. Each user may access the tool 102 over the network 130 using a respective client device 122, 124, 126, 128. Each client device may be implemented as a desktop computer, laptop computer, smart phone, smart glasses, embedded computers and displays, diagnostic devices and the like.

Figure 2:
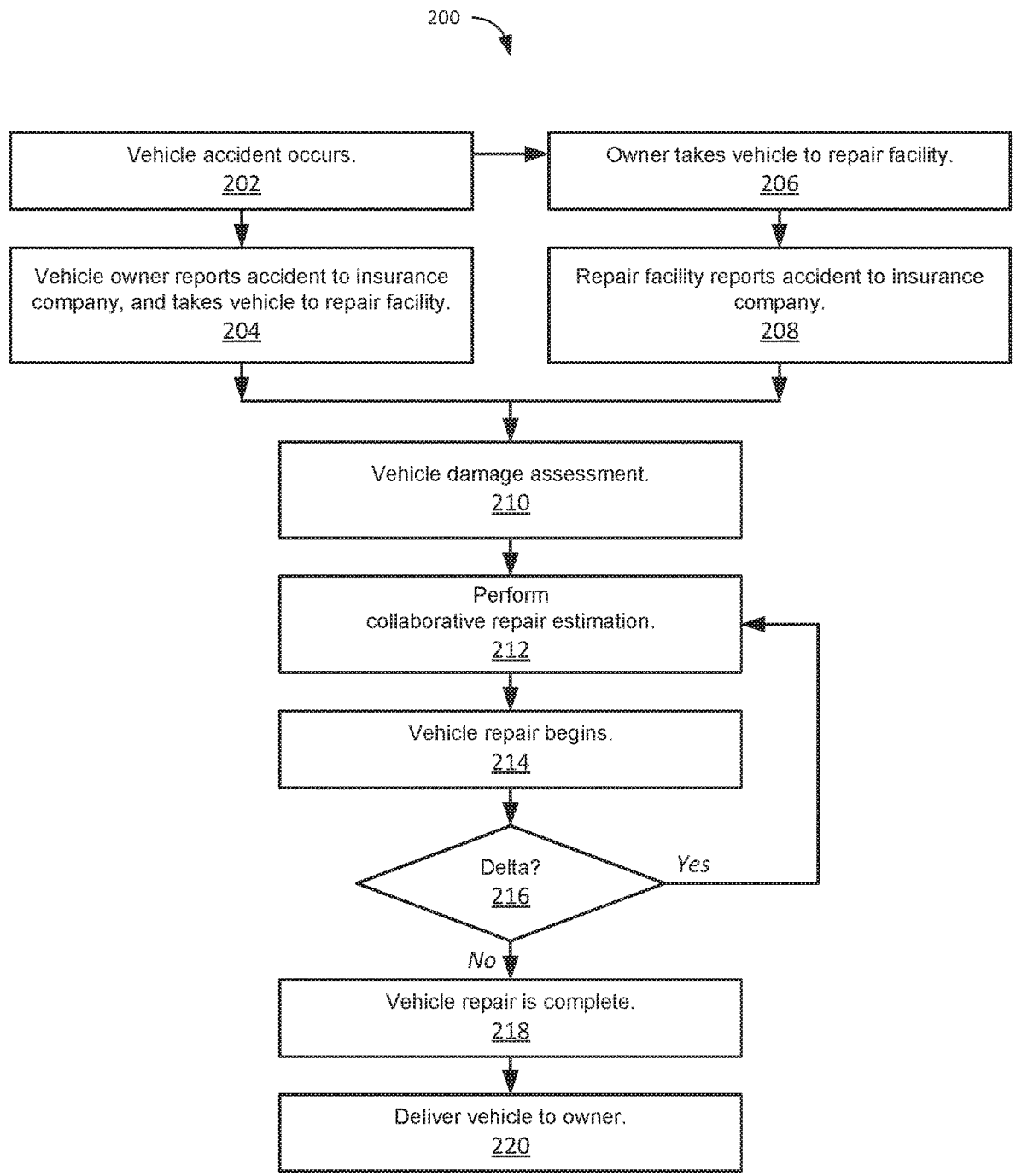
FIG. 2 illustrates a process for a vehicle repair cycle including real-time collaborative repair estimation according to some embodiments of the disclosed technology.

FIG. 2 illustrates a process 200 for a vehicle repair cycle including collaborative repair estimation according to some embodiments of the disclosed technology. The elements of the disclosed processes are presented in a particular order. However, it should be understood that, in various embodiments, one or more elements may be performed in a different order, in parallel, or omitted. Referring to FIG. 2, the process 200 may begin with a vehicle accident, at 202, and may continue with the vehicle owner reporting the accident to an insurance company, and taking the vehicle to a repair facility, at 204. Alternatively, the owner may take the vehicle to a repair facility, at 206, which may report the accident to the insurance company, at 208.

Next, a vehicle damage assessment is performed, at 210. For example, a staff appraiser of an insurance company may visit the damaged vehicle to take photos of the damage. Alternatively, the owner may send photos of the damaged vehicle to the insurance company. Next, the process may include collaborative repair estimation, at 212. This estimation may begin with the automatic generation of an initial vehicle repair estimate record using one or more machine learning models, for example as described in detail below. As part of this process, a machine learning model may make one or more predictions, for example as described above. The generation of the initial repair estimate record may be followed by one or more rounds of revision and review. For example, one or more of the reviewers may agree or disagree with any line item or prediction of the initial estimate.

The vehicle may be taken to an auto repair shop, where an employee may further assess the damage, and may revise the estimate by using a desktop computer to revise the repair estimate record. An insurance staff employee may review the revised record, and accept or reject revisions made by the auto repair shop employee. The auto repair shop employee may accept or reject revisions made by the insurance staff employee. This collaboration process may be repeated as many times as needed.

When the users collaborating on the repair estimate agree, one of the users may commit the repair estimate. After the repair estimate is committed, the repair of the vehicle may begin, at 214 In some cases, a "delta" may occur. That is, a reviewer such as an estimator may disagree with some or all of the repair estimate. When a delta occurs, the process 200 may return to collaborative repair estimation, at 210, for example by generating a supplement estimate. When no additional deltas occur, at 216, the repair of the vehicle may be completed, at 218, and the repaired vehicle may be delivered to the vehicle owner, at 220.

Figure 3:
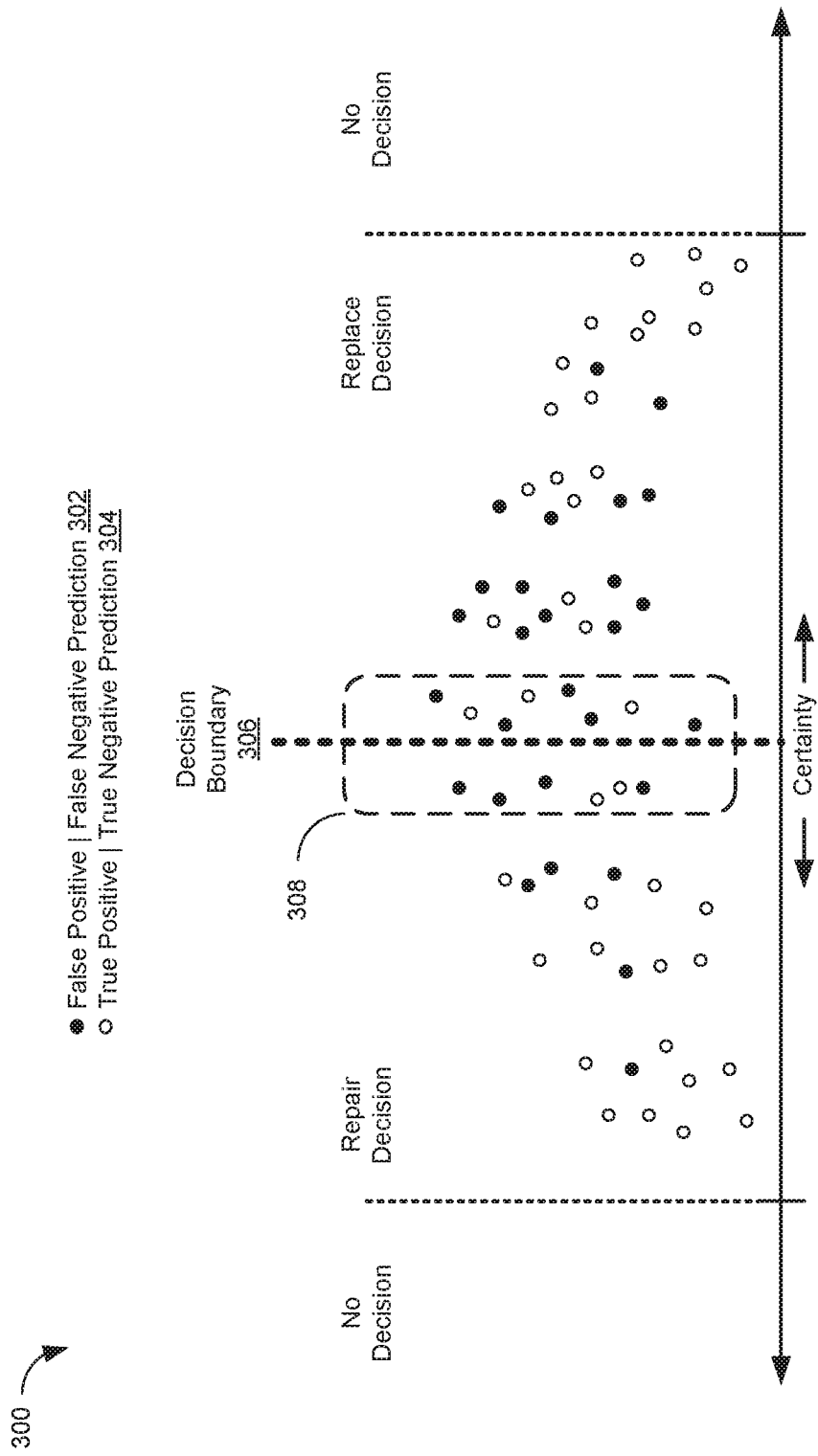
FIG. 3 is a graph that illustrates example vehicle operation predictions made by a machine learning model.

FIG. 3 is a graph 300 that illustrates example vehicle operation predictions made by a machine learning model. As used herein, the term "vehicle operations" may include both repair operations and replace operations for particular vehicle components. In the graph 300, the horizontal axis may represent a degree of certainty in the predictions, and the vertical axis may represent a probability density of the predictions.

Referring to FIG. 3, the predictions are binary. That is, each prediction is either a repair prediction or a replace prediction. In the example of FIG. 3, these predictions are separated by a decision boundary 306, with replace decisions falling to the right of the decision boundary 306, and repair decisions falling to the left. The predictions include false predictions 302 that include false positive or false negative predictions, as well as true predictions 304 that include true positive and true negative predictions. The horizontal axis represents the certainty of the predictions, with predictions farthest from the decision boundary 306 having the greatest certainty. Far from the decision boundary 306 there is insufficient data to make a prediction, so no predictions are made there.

As noted above, a specific problem arises in the realm of this computer technology. In particular, some of the predictions are so close to the decision boundary 306 so as to have very low certainty, as indicated at 308. It is these predictions that are most likely to trigger a disagreement with a human reviewer or among human reviewers. Embodiments of the disclosed technology provide a solution rooted in computer technology that overcomes this problem.

Figure 4:
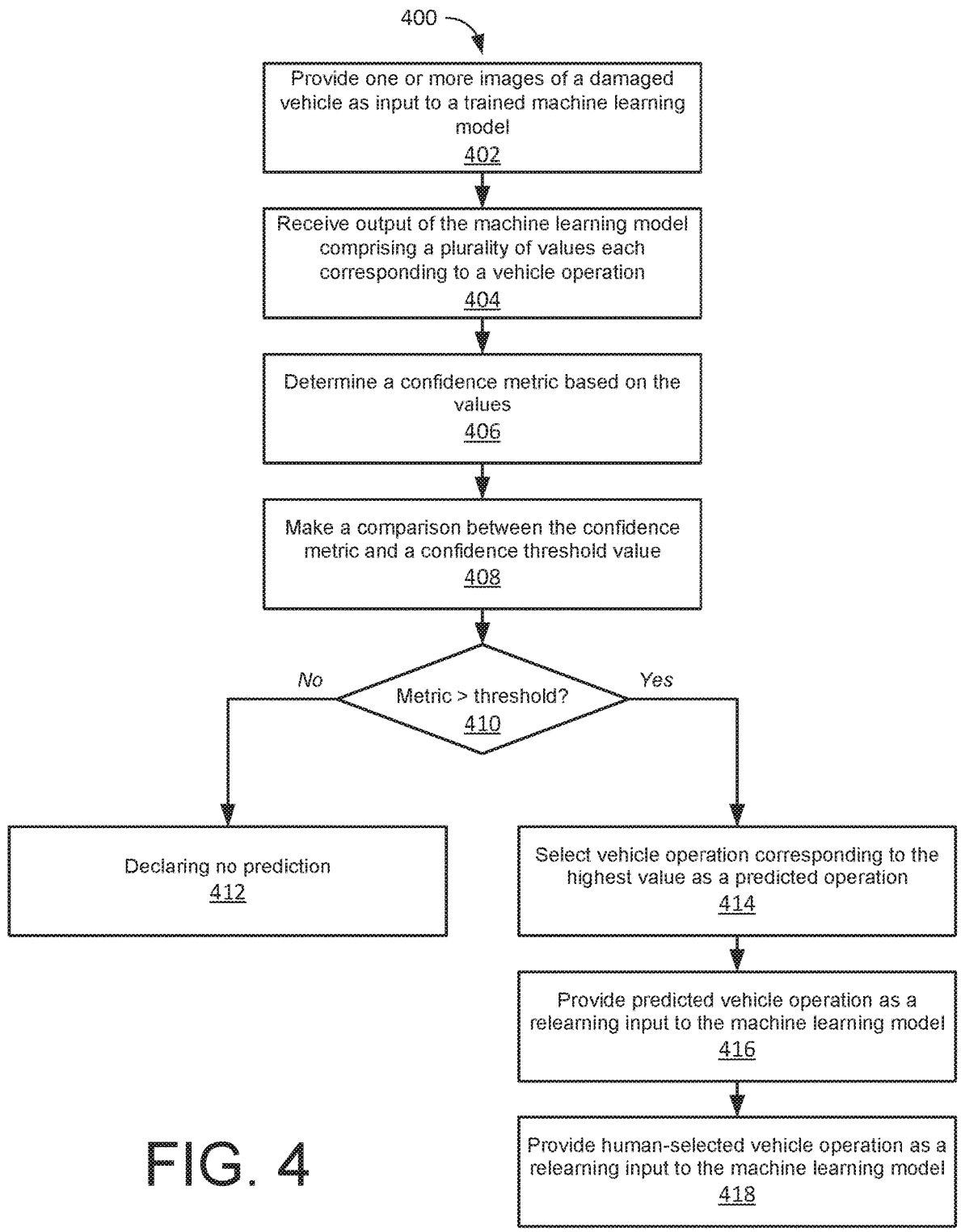
FIG. 4 illustrates a prediction process for creating vehicle repair estimates according to some embodiments of the disclosed technology.

FIG. 4 illustrates a prediction process 400 for creating vehicle repair estimates according to some embodiments of the disclosed technology. The prediction process 400 may be performed, for example, by the collaborative vehicle repair estimating system 100 of FIG. 1. Referring to FIG. 4, the process may include providing one or more images of the damaged vehicle as input for a trained machine learning model, at 402. The trained machine learning model may be implemented, for example, as one or more of the machine learning models 108 of FIG. 1. The machine learning model may be trained, for example, with images of other damaged vehicles and the vehicle operations applied to repair those vehicles. Each of the vehicle operations may represent the repair or replacement of a vehicle component.

Referring again to FIG. 4, the prediction process 400 may include receiving output of the machine learning model, at 404. The output may include a plurality of values, where each of the values corresponds to a vehicle operation.

Figure 5:
FIG. 5 illustrates an example model output according to some embodiments of the disclosed technology.

FIG. 5 illustrates an example model output 500 according to some embodiments of the disclosed technology. Referring to FIG. 5, the example output 500 may include six vehicle operations. In the example of FIG. 5, each of the six vehicle operations is represented by a respective operation code, namely OP 9, OP 11, OP 2, OP 26, OP X, and OP Y. The example output 500 may include a respective floating-point value, as shown in FIG. 5. In some embodiments, the six values sum to one (1). However, other value representations and sums are contemplated. The six vehicle operations in the example output 500 may represent the most likely vehicle operations predicted by the model, with likelier vehicle operations represented by higher floating-point values.

Referring again to FIG. 4, the prediction process 400 may include determining a confidence metric based on the values output by the model, at 406. Determining the confidence metric may include obtaining a difference between the two highest values in the set of values output by the model. Continuing the example of FIG. 5, the two highest values correspond to the vehicle operations OP 9 and OP 11, for a difference of 0.5−0.2=0.3. However, other methods of calculating confidence metrics are contemplated.

Referring again to FIG. 4, the prediction process 400 may include making a comparison between the confidence metric and a confidence threshold value, at 408. When the confidence metric falls below the confidence threshold value, at 410, the process 400 may include declaring no prediction, at 412. In the example of FIG. 1, the vehicle repair estimating system 100 may indicate it cannot make a prediction for this particular vehicle operation.

Referring again to FIG. 4, when the confidence metric exceeds the confidence threshold value, at 410, the prediction process 400 may include selecting the vehicle operation corresponding to the highest value in the set of model output values as the predicted operation, at 414. Continuing the example of FIG. 5, when the confidence threshold is above 0.3, the prediction process 400 may select the vehicle operation OP 9 because its value of 0.5 is the highest value in the set of values output by the machine learning model.

In some embodiments, outputs of the machine learning model may be provided as relearning inputs to the machine learning model. For example, referring again to FIG. 4, the process 400 may include providing the predicted vehicle operation as a relearning input to the machine learning model, at 416. In the example of FIG. 5, the predicted operation code OP 9 may be provided as a relearning input of the machine learning model, and may be linked to one or more of the input images that led to the prediction. In some embodiments, the value corresponding to the predicted operation may be used as a relearning input. In some embodiments, one or more of the other operation codes and corresponding values from the output set may also be provided as relearning inputs for the machine learning model.

As noted above, the predictions may be reviewed by one or more humans, who may agree or disagree with the predictions. That is, a human may agree with a prediction by selecting the predicted vehicle operation, or may disagree with a prediction by selecting a different vehicle operation. In some embodiments, this human-selected vehicle operation may be provided as a relearning input to the machine learning model, at 418. In some embodiments, the human-selected vehicle operation may be provided as a relearning input only when it differs from the model prediction. In some embodiments, the human-selected vehicle operation may be provided as a machine learning input when it is the same as the model prediction.

In some cases, the use of human-selected vehicle operations as relearning inputs may introduce human bias into the model. For example, a reviewer for an insurance company may have a preference for repairing components rather than replacing them in order to reduce costs to the insurance company. Such a reviewer may classify most borderline cases as repair instead of replace. When learning from such a reviewer, the machine learning model may become biased as well, in favor of repairs over replacements. Several solutions to this problem are possible.

One solution is to simply not use human-selected vehicle operations as relearning inputs for the machine learning model. Another simple solution is to use relearning inputs only those outputs that did not result from the use of the disclosed technology. Another solution is to use downstream customer feedback regarding the ultimate outcomes of the repair process to select relearning inputs.

The operation of the machine learning model system can be tuned by adjusting the value of the confidence threshold. The value of confidence threshold may be selected by balancing the costs and benefits of different values. For example, a customer may provide dollar amounts describing these cost and benefits, which may be used to calculate an appropriate confidence threshold value. As another example, if the customer does not wish to disclose these dollar amounts, the customer can be given information concerning what the model would do with one or more particular values of the confidence threshold, and can select a one of the values using this information.

Figure 6:
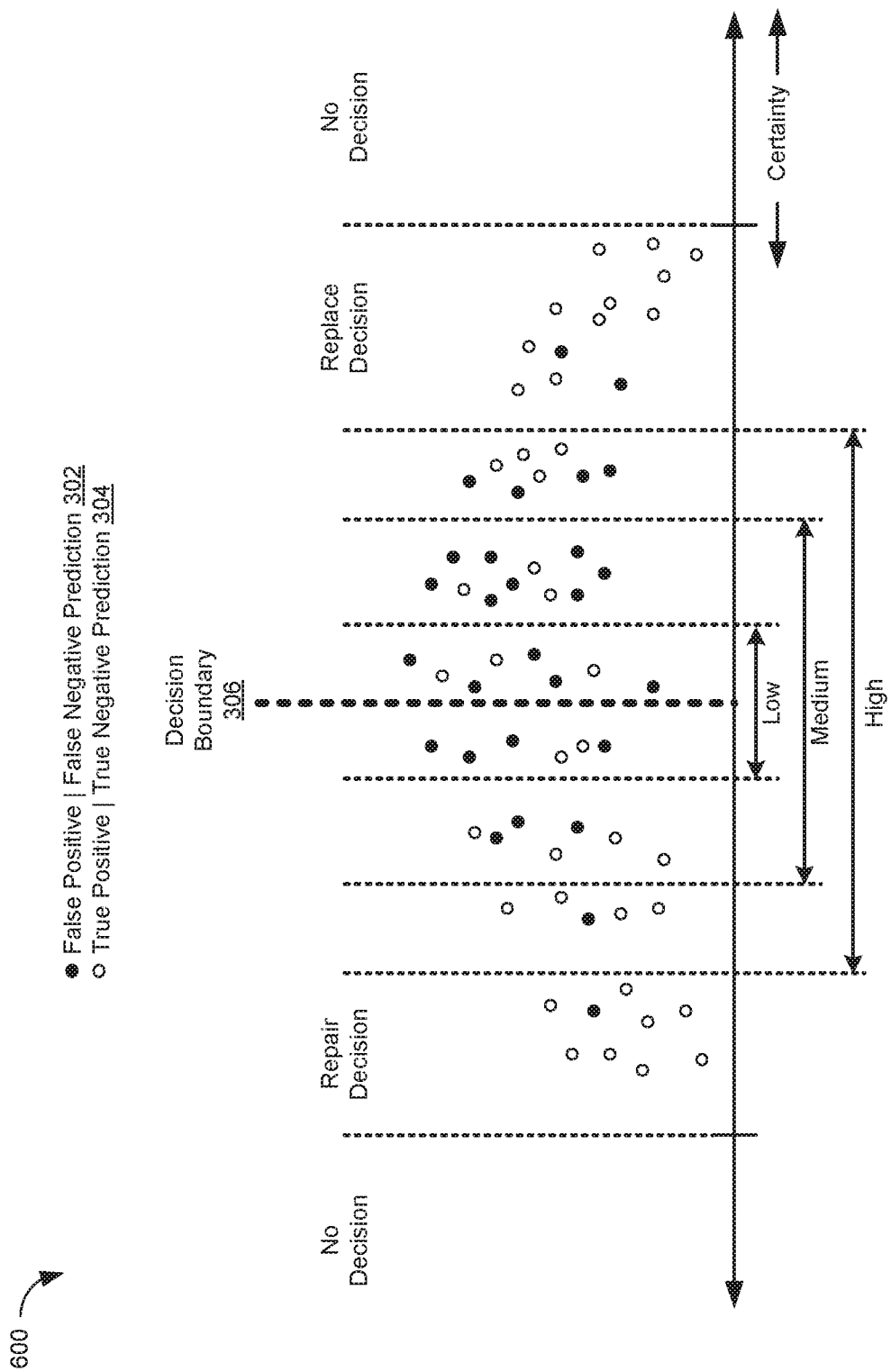
FIG. 6 is a graph illustrating the effects of different confidence thresholds according to embodiments of the disclosed technology.

Different confidence threshold values provide different degrees of margin around the decision boundary, which in turn may affect the proportion of vehicle operations that are classified as too uncertain to predict. FIG. 6 is a graph 600 illustrating the effects of different confidence thresholds according to embodiments of the disclosed technology. In the graph 600, the horizontal axis may represent a degree of certainty in the predictions, and the vertical axis may represent a probability density of the predictions. Referring to FIG. 6, three decision boundary margins are shown as broken lines. The three decision boundary margins are labeled "Low", "Medium", and "High", and correspond to relatively low, medium, and high values of the confidence threshold. In FIG. 6 it can be seen that the greater the value of the confidence threshold, the fewer predictions the model makes. Therefore one can easily tune the model by adjusting the value of the confidence threshold.

Various embodiments may train the machine learning model using supervised machine learning, unsupervised machine learning, and combinations thereof. In supervised machine learning, given some data collected over the past, one can predict an output from an algorithm given an input. This can be written as:

$$f(X)=y,$$

where f is the learning (algorithm) function. The algorithm learns the distribution of X data that maximizes the probability of y. However, in a real world production environment X data changes over time, and changes because of the learning algorithm.

Machine learning may include reinforcement learning (RL). RL features an Environment, which in the disclosed embodiments is the real world. RL also features an Agent which acts in the Environment. The Environment provides a reward signal that the Agent uses to maximize some objective reward function. In supervised learning, the Environment and Agent are used, but the reward function is not used.

The disclosed machine learning model trained as a one-time event can be said to have predicted the operation a human would have selected for a vehicle given a set of images of the vehicle. This can be written as:

$$f(images)=Operations$$

However, outputs of the model will influence the way humans behave, which in turn changes the model. This process becomes recursive, and from an engineering point of view becomes a control problem. This bad outcome occurs without the disclosed technology, but acts much more slowly, and tends to increase the efficiency of the Environment because humans mostly agree, and provide signals by their disagreement that slowly teach the model to be more accurate.

However, with the disclosed technology, a user can change the confidence threshold value to very quickly change the outcome of the model according to the user's short term interest, thereby creating datasets that are skewed towards the user's short term interest without any consideration of long term consequences. From a control theory, this usually ends in one of two scenarios. First, the system may lock in a single direction with total disregard of the real world. Second, the predictions and outcomes may oscillate. Either of those outcomes would be unfortunate for all parties.

Both of these control problems are easily detected by watching metrics over time. In the case of locking, if the repair decision changes rapidly, it will show up in the ratio of repair to replace operations. In the case of oscillation, the problem is easy to see, but more difficult to treat. Oscillation can be solved by dampening, for example by training the machine learning model over a longer period of time. For example, if training over only one year of historic data causes oscillation, then training over three years may cause enough averaging to prevent oscillation.

Embodiments of the disclosed technology provides several advantages compared with previous solutions. For example, a user may tune the disclosed machine learning model simply, by selecting an appropriate confidence threshold value, to reduce the number of disagreements between human estimators and the model, thereby increasing the accuracy of the model. And by providing accurate predictions of vehicle operations, the disclosed technology simplifies and speeds the estimate generation process. Over time, the operation of the disclosed processes may serve to move the decision boundary 306 separating repair operations and replace operations, for example through the disclosed relearning processes. This movement may further improve the accuracy of these processes.

Figure 7:
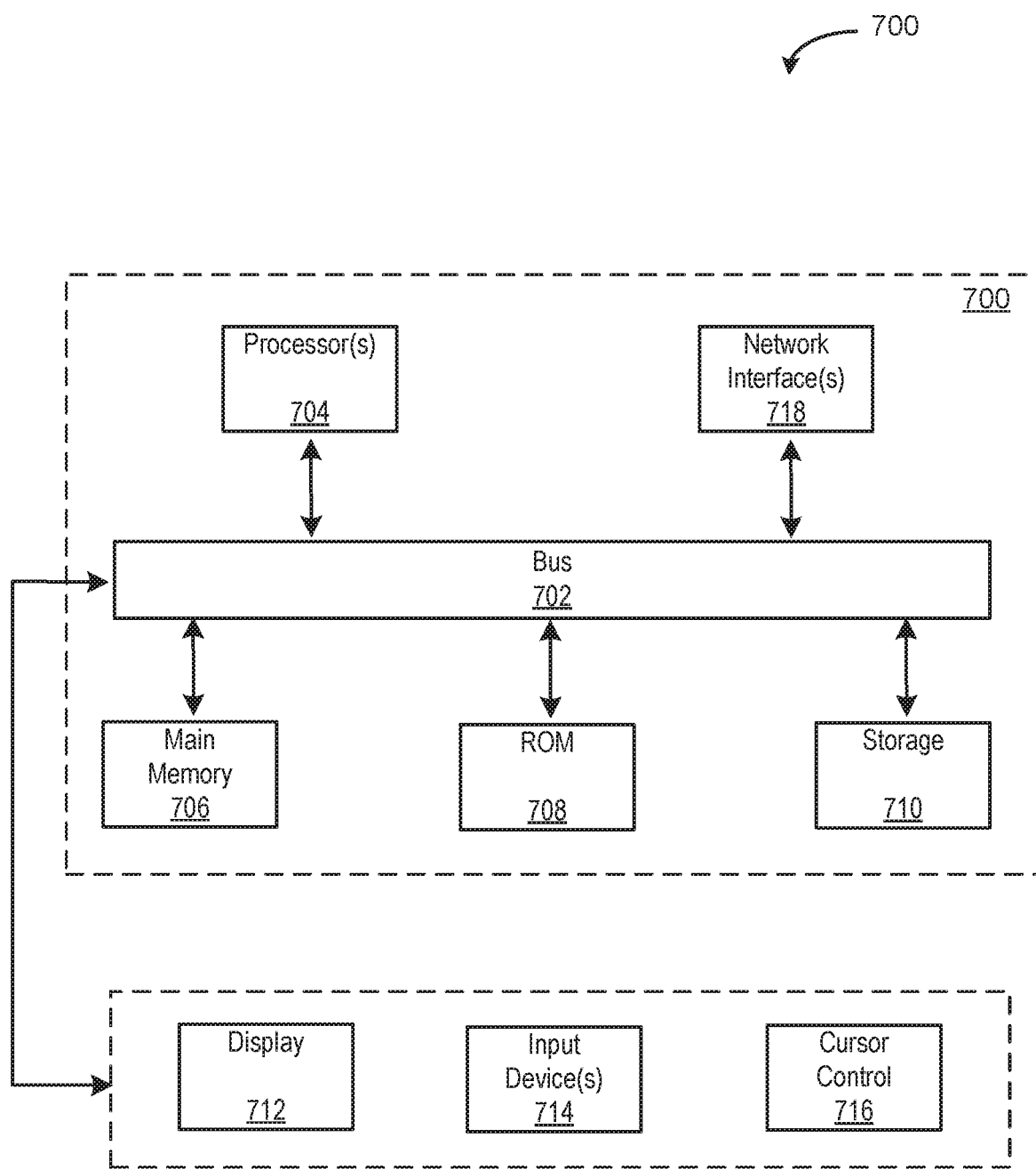
FIG. 7 is an example computing component that may be used to implement various features of embodiments described in the present disclosure.

FIG. 7 depicts a block diagram of an example computer system 700 in which embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C, C++, and Python. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or a WAN component to communicate with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system, comprising:
   a hardware processor; and
   a non-transitory machine-readable storage medium encoded with instructions executable by the hardware processor to perform a method comprising:
   providing one or more images of a damaged vehicle as input to a machine learning model, wherein the machine learning model has been trained with images of other damaged vehicles and corresponding vehicle operations, wherein each of the vehicle operations represents the repair or replacement of a vehicle component;
   receiving output of the machine learning model responsive to the input, wherein the output comprises a plurality of values each corresponding to a respective one of a plurality of the vehicle operations;
   determining a confidence metric based on the values;
   making a comparison between the confidence metric and a confidence threshold value; and
   selecting the one of the plurality of the vehicle operations corresponding to the highest value as a predicted operation based on the comparison.

2. The system of claim 1, wherein determining a confidence metric based on the values comprises:
   obtaining a difference between the two highest values.

3. The system of claim 2, the method further comprising:
   selecting the one of the plurality of the vehicle operations corresponding to the highest value as a predicted vehicle operation responsive to the difference being greater than the confidence threshold value.

4. The system of claim 2, the method further comprising:
   declaring no prediction responsive to the difference being less than the confidence threshold value.

5. The system of claim 1, the method further comprising:
   providing the predicted vehicle operation as a relearning input to the machine learning model.

6. The system of claim 5, the method further comprising:
   obtaining a human selection of one of the vehicle operations; and
   providing the selected vehicle operation as a relearning input to the machine learning model.

7. The system of claim 1, wherein the plurality of values sum to one (1).

8. The system of claim 1, the method further comprising:
   moving a decision boundary separating repair operations and replace operations.

9. A non-transitory machine-readable storage device encoded with instructions executable by a hardware processor of a computing component, the machine-readable storage medium comprising instructions to cause the hardware processor to perform a method comprising:
   providing one or more images of a damaged vehicle as input to a machine learning model, wherein the machine learning model has been trained with images of other damaged vehicles and corresponding vehicle operations, wherein each of the vehicle operations represents the repair or replacement of a vehicle component;
   receiving output of the machine learning model responsive to the input, wherein the output comprises a plurality of values each corresponding to a respective one of a plurality of the vehicle operations;
   determining a confidence metric based on the values;
   making a comparison between the confidence metric and a confidence threshold value; and
   selecting the one of the plurality of the vehicle operations corresponding to the highest value as a predicted operation based on the comparison.

10. The non-transitory machine-readable storage device of claim 9, wherein determining a confidence metric based on the values comprises:
obtaining a difference between the two highest values.

11. The non-transitory machine-readable storage device of claim 10, the method further comprising:
selecting the one of the plurality of the vehicle operations corresponding to the highest value as a predicted vehicle operation responsive to the difference being greater than the confidence threshold value.

12. The non-transitory machine-readable storage device of claim 10, the method further comprising:
declaring no prediction responsive to the difference being less than the confidence threshold value.

13. The non-transitory machine-readable storage device of claim 9, the method further comprising:
providing the predicted vehicle operation as a relearning input to the machine learning model.

14. The non-transitory machine-readable storage device of claim 13, the method further comprising:
obtaining a human selection of one of the vehicle operations; and
providing the selected vehicle operation as a relearning input to the machine learning model.

15. The non-transitory machine-readable storage device of claim 9, wherein the plurality of values sum to one (1).

16. The non-transitory machine-readable storage device of claim 9, the method further comprising:
moving a decision boundary separating repair operations and replace operations.

17. A computer-implemented method comprising:
providing one or more images of a damaged vehicle as input to a machine learning model, wherein the machine learning model has been trained with images of other damaged vehicles and corresponding vehicle operations, wherein each of the vehicle operations represents the repair or replacement of a vehicle component;
receiving output of the machine learning model responsive to the input, wherein the output comprises a plurality of values each corresponding to a respective one of a plurality of the vehicle operations;
determining a confidence metric based on the values;
making a comparison between the confidence metric and a confidence threshold value; and
selecting the one of the plurality of the vehicle operations corresponding to the highest value as a predicted operation based on the comparison.

18. The method of claim 17, wherein determining a confidence metric based on the values comprises:
obtaining a difference between the two highest values.

19. The method of claim 18, further comprising:
selecting the one of the plurality of the vehicle operations corresponding to the highest value as a predicted vehicle operation responsive to the difference being greater than the confidence threshold value.

20. The method of claim 18, further comprising:
declaring no prediction responsive to the difference being less than the confidence threshold value.

21. The method of claim 18, further comprising:
providing the predicted vehicle operation as a relearning input to the machine learning model.

22. The method of claim 21, further comprising:
obtaining a human selection of one of the vehicle operations; and
providing the selected vehicle operation as a relearning input to the machine learning model.

23. The method of claim 17, further comprising:
moving a decision boundary separating repair operations and replace operations.

* * * * *